(12) United States Patent
Wu (10) Patent No.: US 8,594,243 B2
(45) Date of Patent: Nov. 26, 2013

(54) DEVICE AND METHOD OF DATA RECOVERY

(75) Inventor: Sheng-Hung Wu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 985 days.

(21) Appl. No.: 12/605,386

(22) Filed: Oct. 26, 2009

(65) Prior Publication Data

US 2010/0316108 A1 Dec. 16, 2010

(30) Foreign Application Priority Data

Jun. 15, 2009 (TW) ................................ 98119924 A (51) Int. Cl.
*H04L 27/14* (2006.01)
*H04L 27/22* (2006.01)

(52) U.S. Cl.
USPC ............................ 375/326; 375/327; 375/340

(58) Field of Classification Search
USPC ......................................... 375/326, 327, 340
See application file for complete search history.

(56) References Cited

U.S. PATENT DOCUMENTS

| | | | |
|---|---|---|---|
| 5,121,263 A * | 6/1992 | Kerwin et al. ................... 360/53 |
| 5,490,126 A * | 2/1996 | Furumiya et al. ........... 369/59.12 |
| 5,822,143 A * | 10/1998 | Cloke et al. ..................... 360/65 |
| 5,892,632 A | 4/1999 | Behrens et al. |
| 6,292,912 B1 * | 9/2001 | Cloke et al. ................... 714/718 |
| 6,426,983 B1 * | 7/2002 | Rakib et al. ................... 375/346 |
| 6,477,125 B1 * | 11/2002 | Hayami ...................... 369/59.22 |
| 6,480,447 B1 * | 11/2002 | Wakabayashi et al. .... 369/47.17 |
| 6,563,889 B1 * | 5/2003 | Shih et al. ..................... 375/341 |
| 6,594,094 B2 | 7/2003 | Rae et al. |
| 6,594,103 B1 | 7/2003 | Despain et al. |
| 6,845,074 B1 * | 1/2005 | Fujita ........................... 369/59.17 |
| 6,934,233 B2 * | 8/2005 | Miyashita et al. .......... 369/53.16 |
| 7,224,659 B2 * | 5/2007 | Wada ........................... 369/53.35 |
| 7,620,101 B1 * | 11/2009 | Jenkins .......................... 375/240 |
| 7,668,053 B2 * | 2/2010 | Haddad ....................... 369/44.34 |
| 2002/0126593 A1 * | 9/2002 | Okumura et al. ............. 369/47.5 |
| 2002/0159350 A1 * | 10/2002 | Ogura et al. ................ 369/47.35 |
| 2004/0246859 A1 * | 12/2004 | Sonu ........................... 369/53.31 |
| 2009/0185468 A1 * | 7/2009 | Sakai et al. ................. 369/53.35 |

FOREIGN PATENT DOCUMENTS

TW 200414135 8/2004

OTHER PUBLICATIONS

"Office Action of Taiwan counterpart application" issued on Aug. 15, 2012, p. 1-p. 4.

* cited by examiner

*Primary Examiner* — Qutbuddin Ghulamali
(74) *Attorney, Agent, or Firm* — Jianq Chyun IP Office (57) ABSTRACT

A data recovery device and a data recovery method are provided. The data recovery device includes an equalizer, a slicer, a phase lock loop (PLL) circuit, a detection circuit, and a compensation circuit. The equalizer adjusts a radio frequency (RF) signal according to a compensation signal and outputs an equalized RF signal sliced by the slicer according to a slicing level to output an AC_RF signal with segments. The PLL circuit outputs a clock according to phases of the AC_RF signal. The detection circuit calculates and outputs time intervals in the segments according to the clock and detects and outputs sampling heights in the segments. The compensation circuit selects at least two of the sampling heights, calculates a ratio of the selected sampling heights according to the outputs of the detection circuit, and outputs the compensation signal according to a result of comparison between the ratio and a corresponding reference.

14 Claims, 7 Drawing Sheets

DEVICE AND METHOD OF DATA RECOVERY

CROSS-REFERENCE TO RELATED APPLICATION

This application claims the priority benefit of Taiwan application serial no. 98119924, filed on Jun. 15, 2009. The entirety of the above-mentioned patent application is hereby incorporated by reference herein and made a part of specification.

BACKGROUND OF THE INVENTION

1. Field of Invention

The present invention relates to a data recovery device and a data recovery method. More particularly, the present invention relates to a data recovery device and a data recovery method that can be used in an optical storage system.

2. Description of Related Art

Common optical storage systems use laser discs, such as compact discs (CDs) and digital versatile discs (DVDs). To reproduce data stored in an optical disc, an optical disc drive (ODD) projects a laser beam onto the surface of the optical disc. The ODD then reads the laser beam reflected from the optical disc. An electric signal generated according to the reflected laser beam is a radio frequency (RF) signal. There are many reasons that may cause distortion on the RF signal, such as the non-linear channel used during de-focusing, inter-symbol interference (ISI), electrical delay, the pit patterns on the optical disc generated through mass production or injection molding, the scratches on the surface of the disc, aging of the disc, and so on. Distortion leads to decrease in the quality of the RF signal and deterioration of the recognition performance of the ODD. When the ODD reads the optical disc at a high speed, the ISI problem becomes even more severe.

Figure 1:
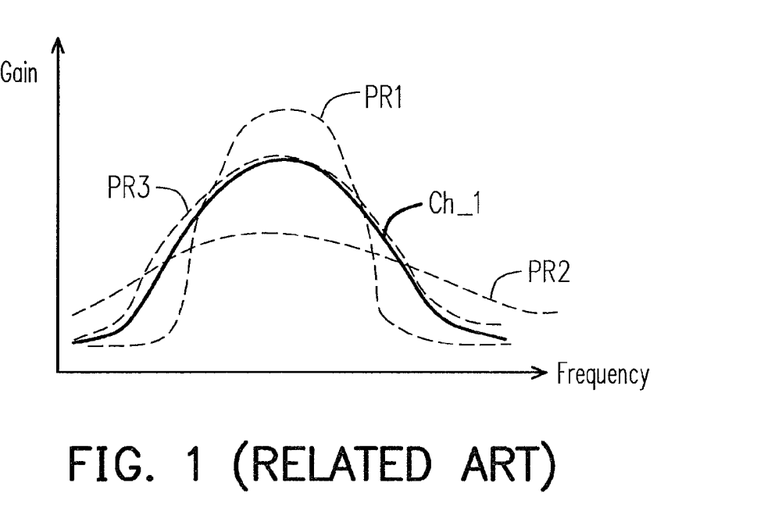
FIG. 1 shows a frequency response waveform diagram of some read channels according to the related art.

To maintain the transmission speed and signal quality at the same time, a partial response (PR) method is usually applied to the conventional optical storage systems to allow ISI within a certain extent. Specifically, the PR method calibrates errors in the signal levels to obtain digital data upon which data can be processed. The Viterbi decoding mechanism of the maximum likelihood (ML) method can be applied to decode the resulting digital data into the originally stored data. Theoretically, the Viterbi decoding mechanism can minimize the errors. However, the mechanism is extremely complicated and difficult to implement. For example, FIG. 1 shows a frequency response waveform diagram of a read channel according to the related art. In a practical optical storage system, the frequency response Ch_1 of the real read channel is similar to neither the partial response channel PR1 nor the partial response channel PR2. If either the partial response channel PR1 or the partial response channel PR2 is used for reading purposes, there will be severe errors. Relatively speaking, if the partial response channel PR3 is used for reading purposes, there will be fewer errors. However, implementing a similar partial response channel will not only incur much additional costs but also complicate circuit designs. In fact, it is relatively simple to implement a less similar partial response channel. Therefore, researches are made as to use a less similar partial response channel for reading purposes and to compensate for the frequency response of the real read channel.

SUMMARY OF THE INVENTION

Accordingly, the present invention is directed to a data recovery device. The data recovery device determines channel characteristics of an RF signal according to sampling heights, such as amplitudes, of the RF signal. The data recovery device adjusts a gain roll-up rate of an equalizer for compensation in a designated frequency range so as to adjust a frequency response of the RF signal. The resulting signal can be read on the selected partial response channel. Accordingly, the data recovery device can increase a recognition rate of the RF signal on the selected partial response channel without necessitating the use of a specific partial response channel having a higher similarity.

An embodiment of the present invention provides a data recovery device. The data recovery device includes an equalizer, a slicer, a phase locked loop (PLL) circuit, a detection circuit, and a compensation circuit. The equalizer receives an RF signal and a compensation signal, tunes the RF signal according to the compensation signal, and outputs an equalized RF signal. The slicer is coupled to the equalizer, receives the equalized RF signal, and slices the equalized RF signal according to a slicing level to output an alternating current RF (AC_RF) signal. The AC_RF signal includes a plurality of signal segments. The PLL circuit is coupled to the slicer, receives the AC_RF signal, and outputs a clock according to phases of the AC_RF signal. The detection circuit is coupled to the slicer and the PLL circuit, receives the AC_RF signal and the clock, calculates time intervals of the AC_RF signal in the signal segments according to the clock, and detects and outputs sampling heights of the signal segments. The compensation circuit is coupled to the detection circuit and the equalizer, selects at least two of the sampling heights of the signal segments according to an output of the detection circuit, calculates a ratio of the at least two of the sampling heights, compares the ratio with a corresponding reference, and outputs the compensation signal to the equalizer according to a comparison result.

According to an embodiment of the present invention, the two signal segments selected by the compensation circuit have different time intervals.

According to an embodiment of the present invention, the equalizer includes an adaptive filter coupled to the slicer. The adaptive filter receives the compensation signal, tunes a frequency response of the RF signal accordingly, and outputs the equalized RF signal.

According to an embodiment of the present invention, the compensation circuit includes a gain calculation circuit and a comparison circuit. The gain calculation circuit is coupled to the detection circuit, selects two of the signal segments to provide two sampling heights, and calculates a gain roll-off rate according to the ratio of the two sampling heights. The comparison circuit is coupled to the gain calculation circuit, receives the ratio, compares the ratio with the corresponding reference, and outputs the compensation signal accordingly.

According to an embodiment of the present invention, the compensation circuit includes a gain calculation circuit and a comparison circuit. The gain calculation circuit is coupled to the detection circuit. The gain calculation circuit categorizes the signal segments into m signal segment sets according to the time intervals of the signal segments. Each of the signal segment sets includes k signal segments having a same time interval. The gain calculation circuit averages k sampling heights of each of the m signal segment sets to generate an average amplitude, selects at least two average amplitudes from m average amplitudes corresponding to the m signal segment sets, and calculates the ratio based on the at least two average amplitudes. The ratio serves as a gain roll-off rate. The parameters m and k are positive integers. The comparison circuit is coupled to the gain calculation circuit, receives the ratio, compares the ratio with the corresponding reference, and outputs the compensation signal accordingly.

According to an embodiment of the present invention, the data recovery device further includes a bit stream generator. The bit stream generator is coupled to the slicer and the PLL circuit and outputs a bit stream according to the AC_RF signal and the clock.

An embodiment of the present invention provides a data recovery method.

The data recovery method includes following steps: tuning an RF signal according to a compensation signal to obtain an equalized RF signal, slicing the equalized RF signal according to a slicing level to obtain an AC_RF signal that includes a plurality of signal segments, detecting sampling heights of the AC_RF signal in the signal segments, selecting at least two sampling heights of at least two of the signal segments to calculate a ratio, comparing the ratio with a corresponding reference to obtain a comparison result, and providing the compensation signal according to the comparison result.

Based on the above, the present invention adjusts the frequency response of a RF signal so that the adjusted RF signal can be read on a selected partial response channel. Therefore, the recognition rate of the RF signal on the selected partial response channel can be increased, the costs for setting up the channel can be reduced, and circuit designs can be simplified.

In order to the make the aforementioned and other features and advantages of the present invention comprehensible, embodiments accompanied with figures are described in detail below.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Based on the above, according to the embodiments of the present invention, an equalizer is used to generate an equalized RF signal according to a received RF signal. The equalizer tunes a frequency response according to a compensation signal. A slicer is used to perform signal partition, so that sampling height and time interval of each signal segment can be defined. A phase look loop (PLL) circuit is used to obtain a clock that is required to define the time intervals. Next, a detection circuit is used to calculate the sampling height and the time interval during each signal segment and to obtain the relationship between the sampling heights and the time segments. Since some exterior effects may cause a single time interval to correspond to multiple different sampling heights, the detection circuit can generate a plurality of amplitude signals. Each of the amplitude signals constitutes a plurality of sampling heights corresponding to the same time interval. Thereafter, a compensation circuit is used to calculate a gain roll-off rate according to the relationship between the time intervals and the amplitude signals determined by the detection circuit. The compensation circuit also calculates the difference between the gain roll-off rate and a corresponding reference R to output the compensation signal accordingly.

Since the frequency response of the compensated RF signal is similar to the channel characteristics of the selected partial response channel, reliability of the RF signal can be improved, and the hardware design is not overly complicated. The following descriptions and drawings illustrate the embodiments of the present invention. For simplicity and consistency, when two or more elements have the same or similar structure or functions, the elements will be labeled by the same name and numerical index.

[First Embodiment]

Figure 2:
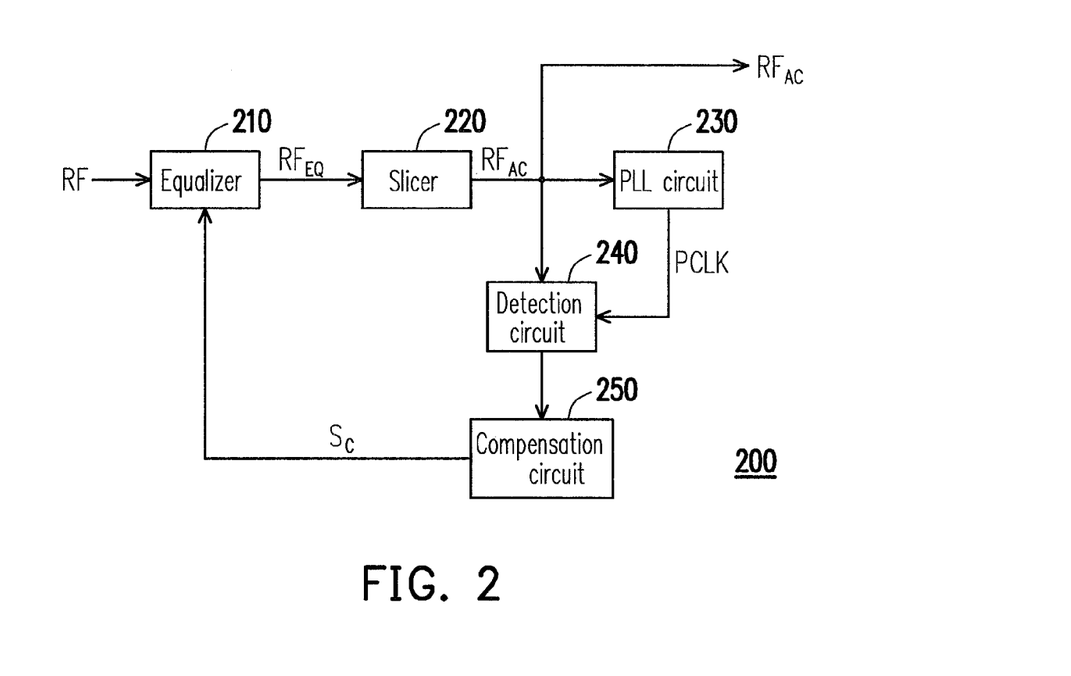
FIG. 2 shows a block diagram of a data recovery device according to a first embodiment of the present invention.

FIG. 2 shows a block diagram of a data recovery device according to a first embodiment of the present invention. In this embodiment, the data recovery device 200 includes an equalizer 210, a slicer 220, a PLL circuit 230, a detection circuit 240, and a compensation circuit 250. The slicer 220 is coupled to the equalizer 210, the PLL circuit 230, and the detection circuit 240. The PLL circuit 230 is coupled to the detection circuit 240. The detection circuit 240 is coupled to the compensation circuit 250. The compensation circuit 250 is coupled to the equalizer 210.

The equalizer 210 receives a RF signal RF through a channel. The RF signal RF can be a data signal generated by an optical disc drive (OOD) (not shown) through reading the surface of an optical disc. The equalizer 210 further receives a compensation signal Sc and tunes the RF signal RF according to the compensation signal Sc. The tuned RF signal RF is output as an equalized RF signal $RF_{EQ}$. The slicer 220 receives the equalized RF signal $RF_{EQ}$ and uses either a predetermined level or the DC level of the equalized RF signal $RF_{EQ}$ as a slicing level. The slicer 220 slices the equalized RF signal $RF_{EQ}$ according to the slicing level to generate an AC_RF signal $RF_{AC}$ which is an alternating signal. The AC_RF signal $RF_{AC}$ has a plurality of signal segments. The DC level of the equalized RF signal $RF_{EQ}$ can be the average level generated through continual analog integration or the average level of the digital sum values (DSVs) generated through digital slicing and feedback control. A subsequent circuit, which is not shown in FIG. 2, can process the AC_RF signal $RF_{AC}$. The PLL circuit 230 receives the AC_RF signal $RF_{AC}$ and outputs a clock PCLK according to phases of the AC_RF signal $RF_{AC}$.

The detection circuit 240 receives the AC_RF signal $RF_{AC}$ and the clock PCLK. The detection circuit 240 calculates the time interval of the AC_RF signal $RF_{AC}$ in each signal segment according to the clock PCLK. The detection circuit 240 also samples sampling height of the AC_RF signal $RF_{AC}$ in each signal segment. In this embodiment, the sampling height of a signal segment can be the amplitude within the signal segment. In another embodiment, the detection circuit 240 samples a signal segment according to the clock PCLK to generate a plurality of samples and selects the maximum sample from the samples as the sampling height of the signal segment. System designers can also define the "sampling height" according to their design requirements. For example, the average of all or a part of the samples within a signal segment can be used as the sampling height of the signal segment.

The compensation circuit 250 selects at least two signal segments from the plurality of signal segments and calculates a ratio of the sampling heights of the selected two signal segments. Through comparing the ratio with a corresponding reference R, the compensation circuit 250 obtains a comparison result. According to the comparison result, the compensation circuit 250 adjusts the compensation signal Sc and outputs the compensation signal Sc to the equalizer 210.

Figure 3:
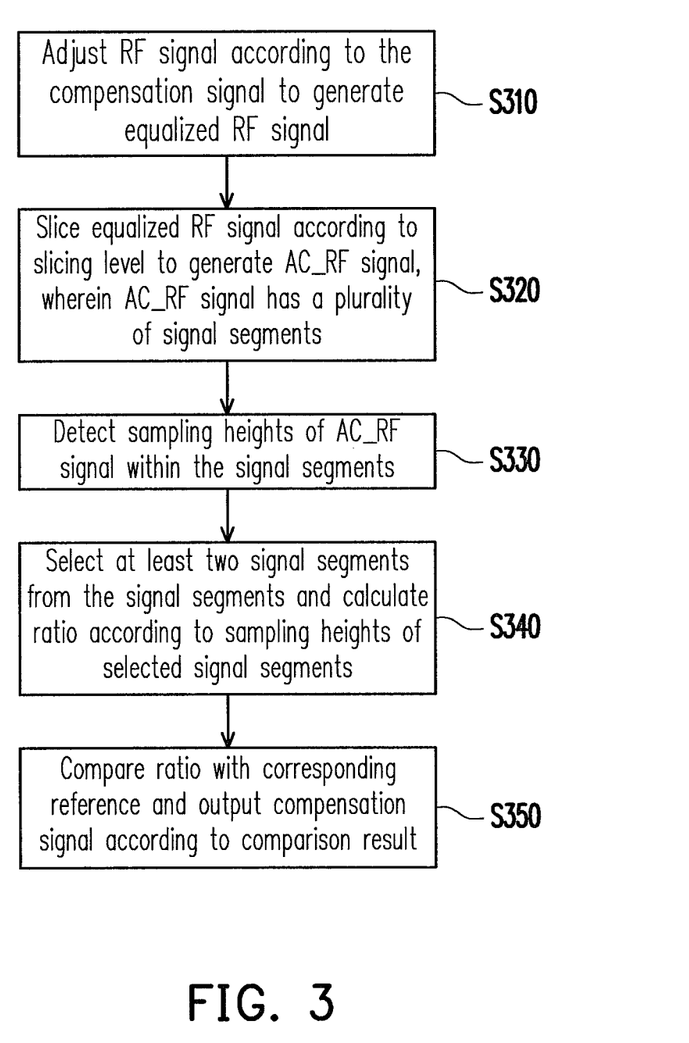
FIG. 3 shows a flowchart of a data recovery method according to the first embodiment of the present invention.

Please refer to both FIG. 2 and FIG. 3. FIG. 3 shows a flowchart of a data recovery method according to the first embodiment of the present invention. First, in step S310, the equalizer 210 receives the RF signal RF and the compensation signal Sc, tunes the RF signal RF according to the compensation signal Sc to generate the equalized RF signal $RF_{EQ}$, and outputs the equalized RF signal $RF_{EQ}$ to the slicer 220. In step S320, the slicer 220 slices the equalized RF signal $RF_{EQ}$ according to the slicing level to generate the AC_RF signal $RF_{AC}$. The AC_RF signal $RF_{AC}$ has a plurality of signal segments. In step S330, the detection circuit 240 receives the AC_RF signal $RF_{AC}$ and detects the sampling heights of the AC_RF signal $RF_{AC}$ within the signal segments. In step S340, the compensation circuit 250 selects at least two signal segments from the signal segments and calculates the ratio according to the sampling heights of the selected signal segments. In step S350, the compensation circuit 250 compares the ratio with the corresponding reference R to obtain a comparison result and outputs the compensation signal Sc to the equalizer 210 according to the comparison result.

Figure 4:
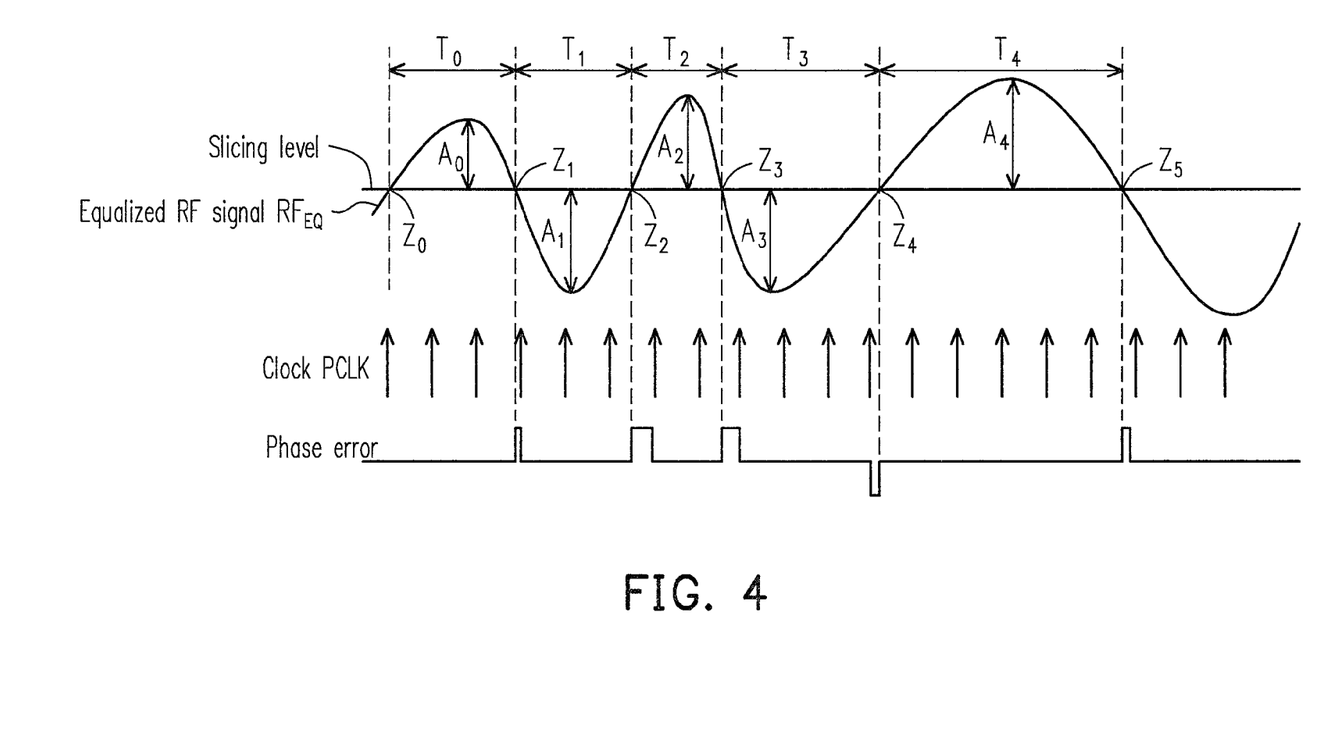
FIG. 4 shows a simulated waveform diagram of an equalized RF signal of the first embodiment of the present invention.

For example, FIG. 4 shows a simulated waveform diagram of the equalized RF signal of the first embodiment of the present invention. Please refer to both FIG. 2 and FIG. 4. When the slicer 220 receives the equalized RF signal $RF_{EQ}$ and slices the equalized RF signal $RF_{EQ}$ according to either the predetermined level or the DC level of the RF signal $RF_{EQ}$, the slicer 220 obtains a plurality of zero-crossing points $Z_0 \sim Z_5$ of the equalized RF signal $RF_{EQ}$ and the slicing level. Every two adjacent zero-crossing points define a signal segment. The slicer 220 slices the equalized RF signal $RF_{EQ}$ according to the slicing level to generate the AC_RF signal $RF_{AC}$.

Please refer to both FIG. 2 and FIG. 4. The detection circuit 240 receives the AC_RF signal $RF_{AC}$ and the clock PCLK and calculates the sampling height and the time interval of each signal segment of the AC_RF signal $RF_{AC}$ according to the clock PCLK. In other words, based on the clock PCLK, the detection circuit 240 calculates the time interval $T_0$ and the sampling height $A_0$ between the zero-crossing points $Z_0$ and $Z_1$, calculates the time interval $T_1$ and the sampling height $A_1$ between the zero-crossing points $Z_1$ and $Z_2$, calculates the time interval $T_2$ and the sampling height $A_2$ between the zero-crossing points $Z_2$ and $Z_3$, and so on. The time intervals are determined according to the clock PCLK. For example, in FIG. 4, the detection circuit 240 can determine that the time interval $T_0$ includes three clock pulses (i.e. 3T period), the time interval $T_1$ includes three clock pulses (i.e. 3T period), and the time interval $T_2$ includes two clock pulses (i.e. 2T period).

The compensation circuit 250 selects two of the signal segments. For example, the compensation circuit 250 can select the signal segment between the zero-crossing points $Z_0$ and $Z_1$ and the signal segment between the zero-crossing points $Z_2$ and $Z_3$ and performs a calculation on the sampling height $A_0$ and the sampling height $A_2$ to obtain a ratio, such as $A_2/A_0$. The compensation circuit 250 can also select two other signal segments having different time intervals.

Through comparing the ratio with the predetermined corresponding reference R, the compensation circuit 250 outputs the compensation signal Sc to the equalizer 210 according to the comparison result. When the partial response model for decoding is changed, the corresponding reference R is also changed according to an ideal ratio corresponding to the new frequency response model.

[Second Embodiment]

The second embodiment is different from the first embodiment in that the ratio is calculated differently in the second embodiment. Specifically, in the second embodiment, two signal segments of the signal segments are selected. The ratio of the sampling heights of the two signal segments is calculated as a gain roll-off rate.

Please refer to both FIG. 2 and FIG. 4. The detection circuit 240 receives the AC_RF signal $RF_{AC}$ and the clock PCLK and calculates the sampling height and the time interval of the AC_RF signal $RF_{AC}$ in each signal segment. In other words, based on the clock PCLK, the detection circuit 240 calculates the time interval $T_0$ and the sampling height $A_0$ between the zero-crossing points $Z_0$ and $Z_1$, calculates the time interval $T_1$ and the sampling height $A_1$ between the zero-crossing points $Z_1$ and $Z_2$, calculates the time interval $T_2$ and the sampling height $A_2$ between the zero-crossing points $Z_2$ and $Z_3$, and so on. In the example shown in FIG. 4, the detection circuit 240 can determine that the time interval $T_0$ includes three clock pulses (i.e. 3T period), the time interval $T_1$ includes three clock pulses (i.e. 3T period), and the time interval $T_2$ includes two clock pulses (i.e. 2T period). The detection circuit 240 can categorize the signal segments of the same time interval as a signal segment set. Taking FIG. 4 as an example, the signal segments, each of which includes the 3T period, can be categorized as a signal segment set. This signal segment set has sampling heights $A_0, A_1$, etc. An average sampling height can be determined according to the sampling heights $A_0$ and $A_1$ of this signal segment set. Similarly, each of the signal segment sets with different time intervals will have an average sampling height. The detection circuit 240 outputs the average sampling heights of the signal segment sets with different time intervals to the compensation circuit 250.

From the average sampling heights of the signal segment sets with different time intervals, the compensation circuit 250 selects two of the average sampling heights of at least two signal segment sets and performs a calculation on the selected average sampling heights of the two signal segment sets to determine a ratio. When the partial response model for decoding is changed, the corresponding reference R is also changed according to an ideal ratio corresponding to the new frequency response model.

[Third Embodiment]

Figure 5:
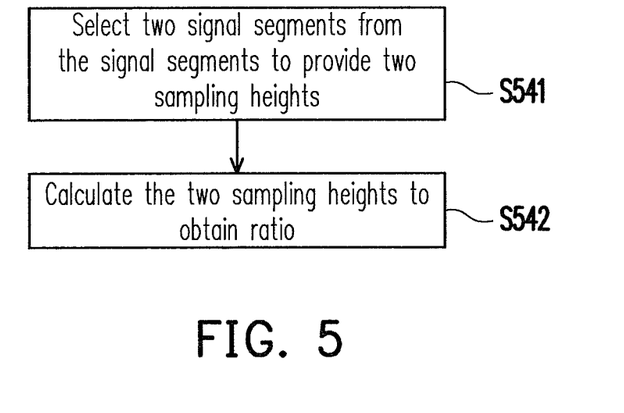
FIG. 5 shows a flowchart of a data recovery method according to a third embodiment of the present invention.

The third embodiment is different from the first embodiment in that two signal segments are selected from the plurality of signal segments, and the gain roll-off rate is calculated according to the sampling heights of the two selected signal segments. Please refer to FIG. 2, FIG. 3, and FIG. 4. In the third embodiment, the detection circuit 240 receives the AC_RF signal $RF_{AC}$ and the clock PCLK and calculates the sampling height and the time interval of the AC_RF signal $RF_{AC}$ in each of the signal segments. FIG. 5 shows a flowchart of a data recovery method according to the third embodiment of the present invention. Please refer to FIG. 3 and FIG. 5. In step S340, the compensation circuit 250 at least selects two signal segments from the plurality of signal segments and calculates a ratio according to the sampling heights of the two selected signal segments. In this embodiment, step S340 can be further divided into sub-step S541 and sub-step S542.

In sub-step S541, the compensation circuit 250 selects two from the plurality of signal segments to provide two sampling heights. For example, referring to FIG. 4, the compensation circuit 250 can select the signal segment within the zero-crossing points $Z_0$ and $Z_1$, which is a 3T period signal segment, to provide the sampling height $A_0$. The compensation circuit 250 can select another signal segment with a different time interval to provide another sampling height. For example, the compensation circuit 250 can select the signal segment within the zero-crossing points $Z_3$ and $Z_4$, which is a 4T period signal segment, to provide the sampling height $A_3$. In the circumstances, the gain roll-off rate is equal to $A_0/A_3$.

Please refer to FIG. 5. In sub-step S542, the compensation circuit 250 performs a calculation on the two sampling heights, which are obtained from sub-step S541, to obtain the ratio (i.e. the gain roll-off rate). The compensation circuit 250 compares the ratio with the predetermined corresponding reference R. According to the comparison result, the compensation circuit 250 outputs the compensation signal to the equalizer 210.

[Fourth Embodiment]

Figure 6:
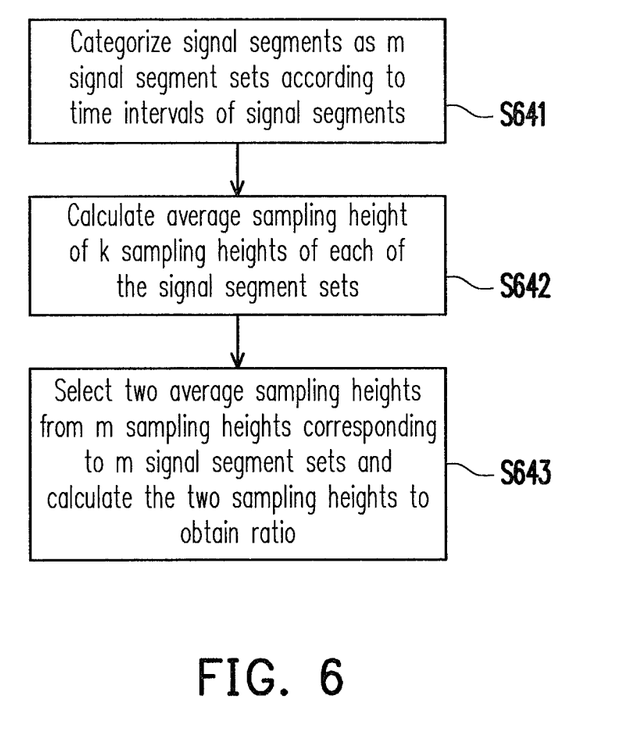
FIG. 6 shows a flowchart of a data recovery method according to a fourth embodiment of the present invention.

The fourth embodiment is different from the second embodiment in that two signal segments with different time intervals are selected in the fourth embodiment to provide two average sampling heights. FIG. 6 shows a flowchart of a data recovery method according to the fourth embodiment of the present invention. Please refer to FIG. 2, FIG. 3, FIG. 4, and FIG. 6. In step S340, the compensation circuit 250 at least selects two signal segments from the plurality of signal segments and calculates the ratio according to the sampling heights of the two selected signal segments. In this embodiment, step S340 can be further divided into sub-step S641, sub-step S642, and sub-step S643.

In sub-step S641, the compensation circuit 250 categorizes signal segments with the same time interval as a signal segment set. In sub-step S642, the average of the sampling heights of each of the signal segment sets is calculated. In sub-step S643, two signal segment sets are selected from the plurality of signal segment sets to provide two average sampling heights for calculating the ratio.

Taking FIG. 4 as an example, the signal segment sets corresponding to the 3T period has a sampling height $A_0$, a sampling height $A_1$, etc. The compensation circuit 250 calculates an average of the sampling height $A_0$ and the sampling height $A_1$ of the signal segment set. The signal segment set corresponding to the 2T period has a sampling height $A_2$ and other sampling heights not shown in FIG. 4. The compensation circuit 250 calculates an average sampling height of the signal segment set. Next, the compensation circuit 250 selects two signal segments from the plurality of signal segments. For example, the compensation circuit 250 selects the signal segment set corresponding to the 3T period and the signal segment set corresponding to the 2T period and calculates the ratio of the average sampling heights of the two signal segment sets as the gain roll-off rate. The compensation circuit 250 then generates the compensation signal Sc according to the gain roll-off rate ratio and the corresponding reference R.

For example, in an HD-DVD system, the average sampling height corresponding to the 2T period and the average sampling height corresponding to the 4T period can be selected, and the gain roll-off rate ratio can be calculated according to the two average sampling heights. In a DVD system, the average sampling height corresponding to the 3T period and the average sampling height corresponding to the 6T period can be selected, and the gain roll-off rate ratio can be calculated according to the two average sampling heights. In addition, the compensation circuit 250 calculates the difference between the ratio and the corresponding reference R and accordingly outputs the compensation signal Sc to the equalizer 210. The equalizer 210 tunes the frequency response of the RF signal RF according to the compensation signal Sc. System designers can select a suitable parameter as the corresponding reference R in order to make the frequency response of the RF signal RF more similar to the channel characteristics of the selected partial response channel.

In this embodiment, the frequency response of the RF signal RF can be adjusted, so that the RF signal RF can be read in the selected partial response channel. Therefore, in this embodiment the recognition rate of the RF signal RF in the selected partial response channel is enhanced.

Please note that there are many ways to adjust the frequency response of the RF signal RF. The above-mentioned example should not be considered as a necessary limitation of the present invention.

[Fifth Embodiment]

The fifth embodiment is different from the first embodiment in that the frequency response of the RF signal RF is compensated in different manners according to the first and the fifth embodiments, respectively. In particular, how the compensation signal is obtained according to the RF signal RF is mentioned in the first embodiment. The fifth embodiment illustrates a method for compensating the RF signal according to the compensation signal.

Figure 7:
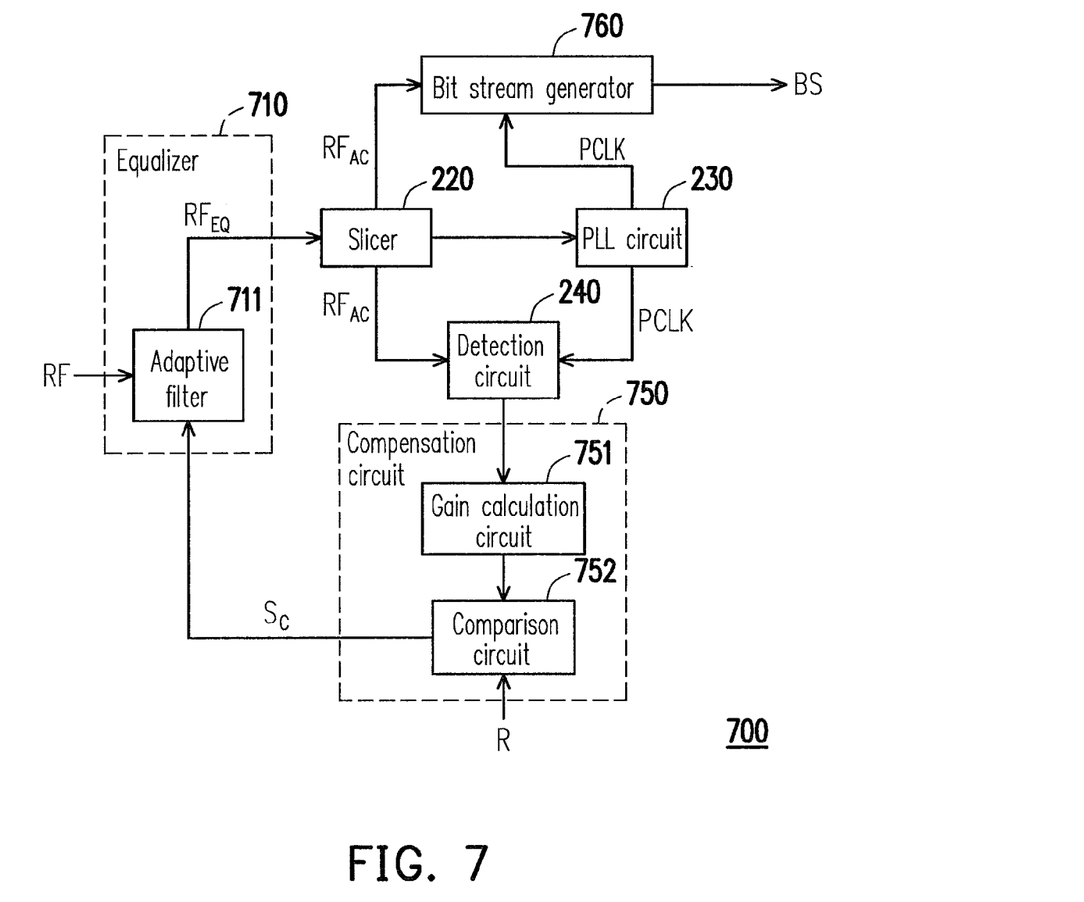
FIG. 7 shows a block diagram of a data recovery device according to a fifth embodiment of the present invention.

FIG. 7 shows a block diagram of a data recovery device according to the fifth embodiment of the present invention. In this embodiment, the data recovery device 700 includes an equalizer 710, a slicer 220, a PLL circuit 230, a detection circuit 240, a compensation circuit 750, and a bit stream generator 760. Some main differences between the first and the fifth embodiments lie in the equalizer 710, the compensation circuit 750, and the bit stream generator 760. The slicer 220 is coupled to the equalizer 710, the PLL circuit 230, and the detection circuit 240. The PLL circuit 230 is coupled to the detection circuit 240. The detection circuit 240 is coupled to the compensation circuit 750. The compensation circuit 750 is coupled to the equalizer 710. The bit stream generator 760 is coupled to the slicer 220 and the PLL circuit 230.

The equalizer 710 can include an adaptive filter 711. The adaptive filter 711 receives the RF signal RF through a channel and tunes the frequency response of the RF signal RF according to the compensation signal Sc. The tuned RF signal is output as the equalized RF signal $RF_{EQ}$. The compensation circuit 750 can include a gain calculation circuit 751 and a comparison circuit 752. The gain calculation circuit 551 receives the output of the detection circuit 240, calculates the gain roll-off rate according to the output of the detection circuit 240, and outputs the gain roll-off rate to the comparison circuit 752. The comparison circuit 752 is coupled to the gain calculation circuit 751. The comparison circuit 752 compares the gain roll-off rate with the corresponding reference R and outputs the compensation signal accordingly. Using the AC_RF signal $RF_{AC}$ and the clock PCLK as references, the bit stream generator 760 outputs the AC_RF signal $RF_{AC}$ with the tuned frequency response as a bit stream BS. The bit stream BS can be provided to a subsequent circuit, which is not shown in FIG. 7, for further processing.

Specifically, the gain calculation circuit 751 calculates the gain roll-off rate through calculating the frequency response of each signal segment. The gain calculation circuit 751 selects two of the signal segments, calculates a ratio of sampling heights of the two selected signal segments, and outputs the ratio to the comparison circuit 752. In this embodiment, a corresponding reference R can be predetermined by a user. The comparison circuit 752 compares the ratio with the predetermined corresponding reference R to determine how to compensate for the gain roll-off rate. The ratio and the corresponding reference are compared, so that the gain roll-off rate can be adjusted to become more similar to the channel characteristics of the selected partial response channel.

In some embodiments, the comparison circuit 752 can include a subtracter, which is not shown in FIG. 7. The subtracter is coupled between the gain calculation circuit 751 and the equalizer 710. The subtracter calculates the difference between the ratio generated by the gain calculation circuit 751 and the corresponding reference R. The difference is considered as the compensation signal Sc, and the compensation signal Sc is output to the equalizer 710.

For example, when the ratio generated by the gain calculation circuit 751 is not larger than the corresponding reference R, the comparison circuit 752 outputs the compensation signal Sc for instructing the adaptive filter 711 to increase the gain roll-up rate at a designated frequency, and thereby the RF signal RF is adjusted/compensated. When the ratio generated by the gain calculation circuit 751 is larger than the corresponding reference R, the comparison circuit 752 outputs the compensation signal Sc for instructing the adaptive filter 711 to lower the gain roll-up rate at the designated frequency, and thereby the RF signal RF is adjusted/compensated.

Figure 8:
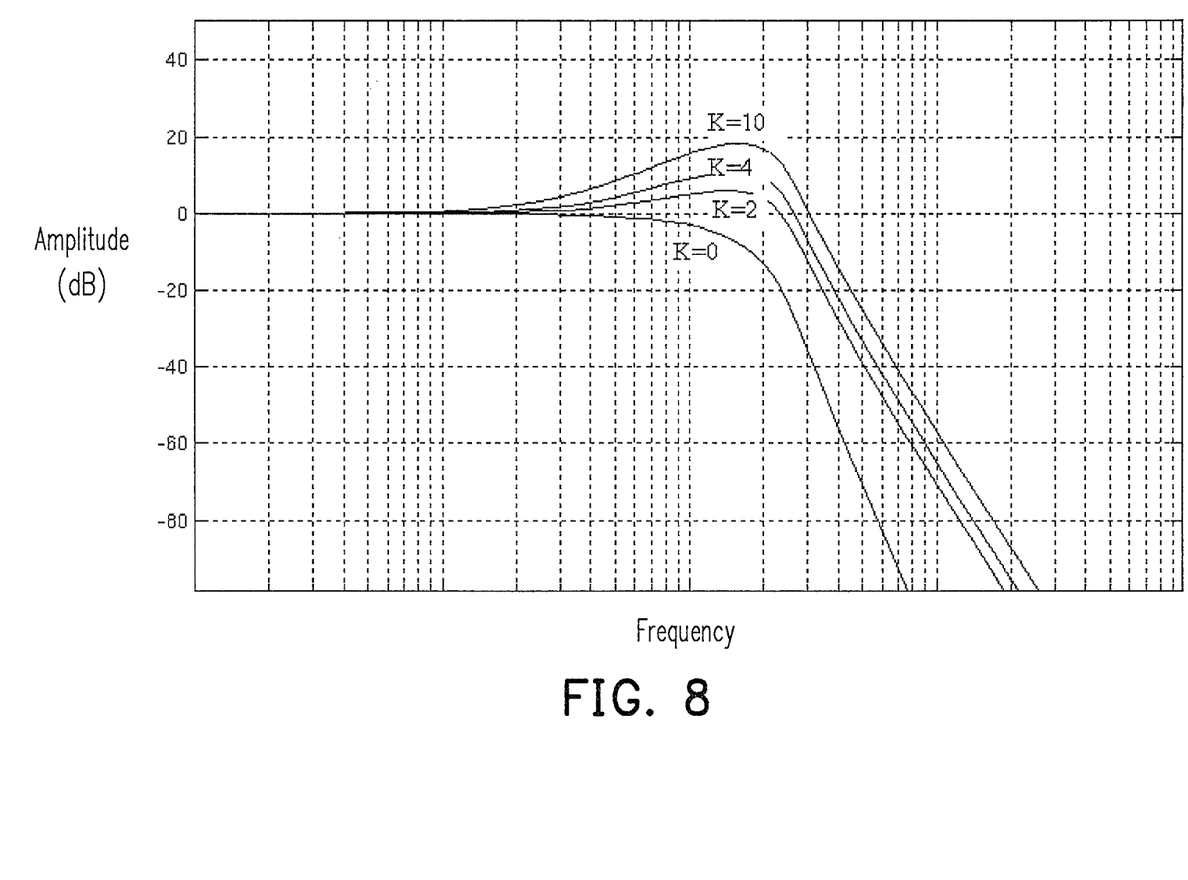
FIG. 8 shows a simulated waveform diagram of the gain roll-up rates under different compensation parameters for compensating the RF signal at designated frequencies according to the fifth embodiment of the present invention.

For example, FIG. 8 shows a simulated waveform diagram of the gain roll-up rates under different compensation parameters K for compensating the RF signal at designated frequencies according to the fifth embodiment of the present invention. Please refer to FIG. 7 and FIG. 8, this embodiment provides a method for compensating the RF signal RF, and the compensation method is represented in the following equation:

$$\frac{-Ks^2 + 1.31703}{s^2 + 1.68495s + 1.31703} * \frac{2.95139}{s^2 + 1.54203s + 2.95139} * \frac{5.37034}{s^2 + 1.4558s + 5.37034} * \frac{0.86133}{s + 0.86133}$$

Here, the compensation parameter K is used to control different gain roll-up rates to compensate the RF signal RF. Please refer to FIG. 7 and FIG. 8. When the ratio is not larger than the corresponding reference R, the comparison circuit 752 outputs a larger compensation parameter K to the adaptive filter 711. The adaptive filter 711 accordingly increases the gain roll-up rate. On the contrary, when the ratio is larger than the corresponding reference R, the comparison circuit 752 outputs a smaller compensation parameter K to the adaptive filter 711. The adaptive filter 711 accordingly decreases the gain roll-up rate. By selecting different compensation parameters K, the frequency response of the RF signal RF can become more similar to the channel characteristics of the selected partial response channel. Besides, inter symbol interference (ISI) can also be decreased to improve the reliability of the compensated signal.

Figure 9:
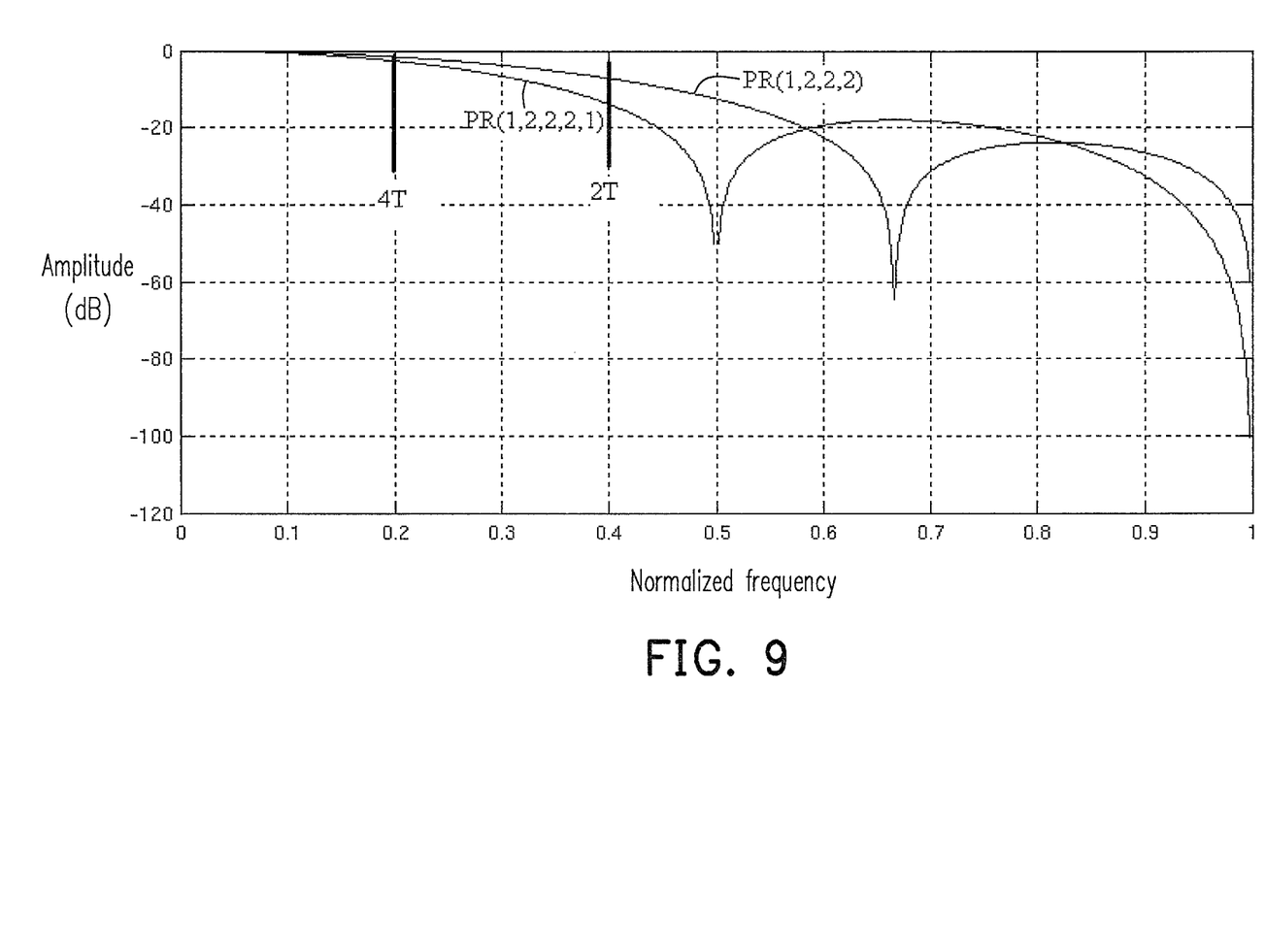
FIG. 9 shows a waveform diagram of a partial response on a normalized frequency domain simulating the channel characteristics according to the fifth embodiment of the present invention.

FIG. 9 shows a waveform diagram of a partial response on a normalized frequency domain simulating the channel characteristics according to the fifth embodiment of the present invention. The over-sampling rate is 1.25 times. Please refer to FIG. 8 and FIG. 9. Originally, the RF signal RF belongs to the PR(1,2,2,2,1). A properly selected gain roll-up rate is used to convert the frequency response of the RF signal RF to PR(1,2,2,1). It can be seen from FIG. 9 that the gain roll-off rates for the 2T period signal segments and the 4T period signal segments of the RF signal RF are increased to reduce the difference between the 2T period signal segments and the 4T period signal segments. Please note that different partial response models can correspond to different gain roll-off rates.

It deserves mentioning that in another embodiment, the bit stream generator 760 can receive the AC_RF signal and the clock and output the RF signal with the adjusted frequency response as the bit stream.

In sum, the embodiments of the present invention provide a data recovery device and a data recovery method. The gain roll-off rate of an RF signal is detected. The detected gain roll-off rate is compared with the channel characteristics of the channel transmitting the RF signal. The gain roll-up rate utilized by an equalizer at a designated frequency for compensating the frequency response of the RF signal is adjusted. The result is that the compensated RF signal can be read through the selected partial response channel to decrease ISI and to increase the recognition rate of the RF signal at the selected partial response channel. Therefore, selection of a partial response channel with great similarity is not required in the embodiments of the present invention. Accordingly, according to the embodiments, the cost of designing the channels can be reduced, and complicated circuit designs can be avoided.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A data recovery device, comprising:
an equalizer, receiving an radio frequency (RF) signal and a compensation signal, tuning the RF signal according to the compensation signal, and outputting an equalized RF signal;
a slicer, having an input terminal coupled to an output tenninal of the equalizer for receiving the equalized RF signal and slicing the equalized RF signal according to a slicing level to output an alternating current RF (AC_RF) signal, the AC_RF signal comprising a plurality of signal segments;
a phase locked loop (PLL) circuit, having an input terminal coupled to an output terminal of the slicer for receiving the AC_RF signal and outputting a clock according to phases of the AC_RF signal;
a detection circuit, coupled to the output terminal of the slicer and an output tenninal of the PLL circuit for receiving the AC_RF signal and the clock, calculating the time intervals of the AC_RF signal in the signal segments according to the clock, and detecting and outputting sampling heights of the signal segments; and
a compensation circuit, coupled to the detection circuit and the equalizer, the compensation circuit selecting at least two of the sampling heights of the signal segments according to an output of the detection circuit, calculating a ratio of the at least two of the sampling heights, comparing the ratio with a corresponding reference to obtain a comparison result, and outputting the compensation signal to the equalizer according to the comparison result, the compensation circuit comprising:

a gain calculation circuit coupled to the detection circuit, the gain calculation circuit categorizing the signal segments into m signal segment sets according to the time intervals of the signal segments, each of the signal segment sets comprising a plurality of signal segments having a same time interval, the gain calculation circuit averaging a plurality of sampling heights of each of the signal segment sets to generate an average amplitude, selecting at least two average amplitudes from m average amplitudes corresponding to the m signal segment sets, and calculating a ratio based on the at least two average amplitudes, wherein the ratio serves as a gain roll-off rate, and m is a positive integer; and a comparison circuit coupled to the gain calculation circuit, the comparison circuit receiving the ratio, comparing the ratio with the corresponding reference, and outputting the compensation signal accordingly.

2. The data recovery device of claim 1, wherein the at least two of the signal segments selected by the compensation circuit have different time intervals.

3. The data recovery device of claim 1, wherein the equalizer comprises an adaptive filter coupled to the slicer, the adaptive filter receives the compensation signal and tunes a frequency response of the RF signal accordingly, and outputs the equalized RF signal.

4. The data recovery device of claim 3, wherein the adaptive filter adjusts a gain roll-up rate of the adaptive filter at a designated frequency according to the compensation signal.

5. The data recovery device of claim 1, wherein
the gain calculation circuit selects the two sampling heights of the signal segments and calculates the gain roll-off rate according to the ratio of the two sampling heights.

6. The data recovery device of claim 5, wherein the comparison circuit comprises a subtracter coupled between the gain calculation circuit and the equalizer, for calculating a difference between the ratio and the corresponding reference, and outputting the compensation signal to the equalizer, wherein the difference between the ratio and the corresponding reference serves as the compensation signal.

7. The data recovery device of claim 1, further comprising a bit stream generator coupled to the slicer and the PLL circuit, the bit stream generator outputting a bit stream according to the AC_RF signal and the clock.

8. A data recovery method, comprising:
tuning an radio frequency (RF) signal according to a compensation signal to obtain an equalized RF signal by an equalizer;
slicing the equalized RF signal according to a slicing level to obtain an alternating current RF (AC_RF) signal that comprises a plurality of signal segments by a slicer, having an input terminal coupled to an output terminal of the equalizer;
detecting sampling heights of the AC_RF signal in the signal segments by a detection circuit, coupled to an output terminal of the slicer and an output terminal of a phase locked loop (PLL) circuit;
selecting at least two sampling heights of the signal segments to calculate a ratio; and
comparing the ratio with a corresponding reference to obtain a comparison result and providing the compensation signal according to the comparison result, wherein the step of selecting the at least two sampling heights of the at least two of the signal segments to calculate the ratio comprises:
categorizing the signal segments into m signal segment sets according to time intervals of the signal segments, each of the signal segment sets comprising k signal segments having a same time interval;
averaging k sampling heights of each of the signal segment sets to generate an average sampling height; and
selecting at least two average sampling heights from m average sampling heights corresponding to the m signal segment sets and calculating the ratio based on the at least two average sampling heights, where m and k are positive integers.

9. The data recovery method of claim 8, further comprising:
obtaining a clock according to phases of the AC_RF signal; and
calculating the time intervals of the signal segments according to the clock,
wherein the at least two signal segments selected have different time intervals.

10. The data recovery method of claim 8, wherein the step of tuning the RF signal according to the compensation signal to obtain the equalized RF signal comprises:
adjusting a frequency response of the RF signal according to the compensation signal to obtain the equalized RF signal.

11. The data recovery method of claim 10, wherein the step of adjusting the frequency response of the RF signal comprises:
compensating a gain roll-up rate of the frequency response of the RF signal at a designated frequency according to the compensation signal.

12. The data recovery method of claim 8, wherein the step of comparing the ratio with the corresponding reference to obtain the comparison result and providing the compensation signal according to the comparison result comprises:
selecting the two of the signal segments to provide the two sampling heights; and
calculating the ratio based on the two sampling heights.

13. The data recovery method of claim 12, wherein the step of comparing the ratio with the corresponding reference to obtain the comparison result and providing the compensation signal according to the comparison result comprises:
calculating a difference between the ratio and the corresponding reference, wherein the difference between the ratio and the corresponding reference serves as the compensation signal.

14. The data recovery method of claim 8, further comprising:
obtaining a bit stream according to the AC_RF signal and the clock.

* * * * *